United States Patent [19]

Daly

[11] Patent Number: 5,012,701
[45] Date of Patent: May 7, 1991

[54] METHOD OF MAKING A THREADED RETAINER RING FOR A ROLLER CUTTER ON A DRILL BIT

[75] Inventor: Jeffrey E. Daly, Cypress, Tex.
[73] Assignee: Camco International Inc.
[21] Appl. No.: 475,285
[22] Filed: Feb. 5, 1990
[51] Int. Cl.⁵ ............................................. B21K 5/02
[52] U.S. Cl. .................................................. 76/108.2
[58] Field of Search ................. 76/101.1, 108.1, 108.2

[56] References Cited

U.S. PATENT DOCUMENTS 1,010,144 11/1911 Hughes.
2,513,634 4/1946 Francis.
3,971,600 7/1976 Murdoch et al.
4,491,428 1/1985 Burr et al.
4,802,539 7/1989 Hall et al.

Primary Examiner—Roscoe V. Parker
Attorney, Agent, or Firm—Dodge, Bush & Moseley

[57] ABSTRACT

A method of making a threaded ring (24) into two (2) semicircular portions (30, 32) for fitting within a groove (19) on a journal (12) of a drill bit (10) to retain a roller cutter (20) thereon. The ring (24) is first formed with screw threads (26) about an oversized outer diameter and then cut into two semicircular portions (30, 32). The amount of the oversized outer diameter compensates for the thickness of the material removed by the cut as shown at W. If the thickness of the cut exceeds a certain amount, yielding of the ring is provided as shown in FIGS. 3-7 to provide a permanent set to compensate for the thickness W of the material removed.

14 Claims, 2 Drawing Sheets

METHOD OF MAKING A THREADED RETAINER RING FOR A ROLLER CUTTER ON A DRILL BIT

BACKGROUND OF THE INVENTION

This invention relates to a method of making a threaded retainer ring for retaining a roller cutter on a drill bit, and more particularly to a method of making a retainer ring having external screw threads about its outer circumference for threaded engagement with a roller cutter to retain the roller cutter on a journal of the drill bit.

Heretofore, such as shown in U.S. Pat. No. 3,971,600 dated July 27, 1976, a roller cutter on a rotary drill bit has been mounted on a journal of the drill bit for rotation and retained on the journal by an externally threaded split ring. The split ring includes two semicircular portions which are first fitted within a groove in the journal and then the roller cutter is threaded onto the ring with the ring forming a thrust bearing.

It is necessary for a prolonged life of a cutter under adverse operating conditions that a proper fit occurs between the screw threads of the ring and cutter, and that minimum axial looseness occurs between the semicircular ring portions and the journal. If the screw threads are formed on the ring prior to the cutting of the ring into two portions, the two cuts made in the ring cause the ring halves to be out-of-round and undersized at right angles to the direction of the split.

It is necessary in order to obtain a relatively tight fit between the threads on the roller cutter and ring that minimal clearance be provided between the interfitting threads. If there is not adequate contact between the interfitting threads, possible mechanical wear and/or breakage problems such as stripping of threads may occur, particularly upon prolonged periods of use in certain types of hard formations. If the cut in a ring is around 0.003 inch or greater, an undesirable looseness may be provided between the roller cutter and ring resulting from the decreased outer diameter of the ring. While cutting methods utilizing lasers or thin diamond saws may provide cuts having a thickness less than 0.003 inch, such methods are expensive and/or time consuming. The present invention is particularly directed to cuts in a ring having a thickness between 0.003 inch and 0.045 inch.

Thus, it has been common heretofore to form the ring with *screw threads after the ring halves or semicircular portions have been formed. One method heretofore for providing screw threads on the separate semicircular portions of the ring has been to split lengthwise a tubular bar and then clamp or weld the two split portions together. Next, the outer peripheral surfaces of the split portions are finish machined and screw threads formed thereon. Then the inner periphery of the ring portions is finish machined. A plurality of semicircular ring portions may then be sliced from the length of the split tubular bar. Such a method for making the semicircular ring halves or portions is time consuming and expensive as a result of the several steps involved and the required machining tolerances.

SUMMARY OF THE INVENTION

The present invention is directed to a method of making a split threaded retainer ring for a roller cutter on a drill bit in which the ring is formed with screw threads prior to being split or cut into two semicircular portions for fitting within an annular groove on the journal mounting the roller cutter.

The ring is initially formed with a predetermined oversized outer diameter and the screw threads are then formed on the oversized outer diameter. Then the ring is cut into two semicircular portions with the width of the cut being compensated for by the oversized diameter of the ring prior to cutting. After removal of the material by the cuts, the two semicircular portions if placed end-to-end, would be out-of-round or in a noncircular or slightly oval configuration.

If not more than around a 0.015 inch thickness cut is made after first being compensated for by an oversized outer diameter, the two halves of the ring can easily be threaded onto the roller cutter with an acceptable fit. However, if the width of the cut is greater than about 0.015 inch the two semicircular ring portions are yielded under a compressive loading to provide a permanent set for returning the ring halves to a circular configuration with a reduced outer diameter which conforms to the desired outer diameter of the threaded ring. The predetermined outer ring diameter is determined for providing a minimal axial looseness about the journal and for providing a tight fit with the internal screw threads of the roller cutter.

The amount of oversizing for a specific ring diameter and width of cut may be determined by a formula as will be explained further. Alternately the oversized ring may be yielded to provide a permanent set before the threaded ring is cut into semicircular sections. The type of fit between the screw threads of the ring and the screw threads of the cutter is predetermined to provide a desired clearance and tolerance and the formula for determining the amount of oversizing includes the predetermined desired thread fit.

It is an object of this invention to provide a relatively simple inexpensive method of making a threaded retainer ring into two semicircular portions for retaining a roller cutter on a journal of a drill bit.

It is a further object of this invention to provide such a method in which a threaded retainer ring having an oversized outer diameter is first formed with external screw threads before being cut or formed into the two semicircular portions.

It is an additional object of this invention to provide such a method in which a retainer ring having an oversized outer diameter is first formed with screw threads about its outer periphery and is thereafter yielded to provide a permanent set for the semicircular portions at a desired predetermined outer diameter.

Other objects, features, and advantages of this invention will become more apparent after referring to the following specifications and drawings.

DESCRIPTION OF THE INVENTION

Figure 1:
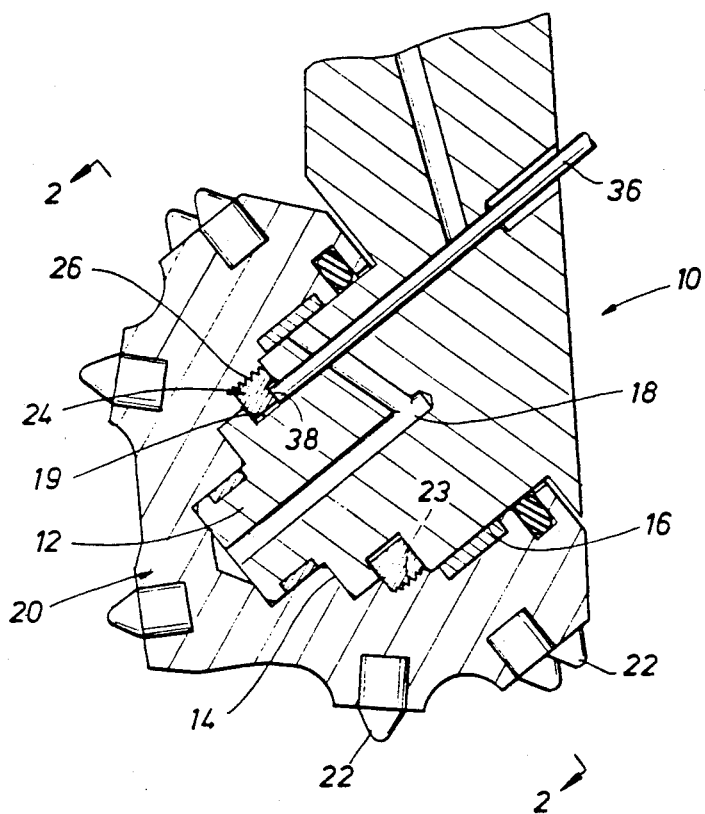
FIG. 1 is an enlarged sectional view of a portion of a roller cutter drill bit having a roller cutter mounted on a journal for rotation and retained on the journal by a threaded retainer ring including two semicircular portions.
Figure 2:
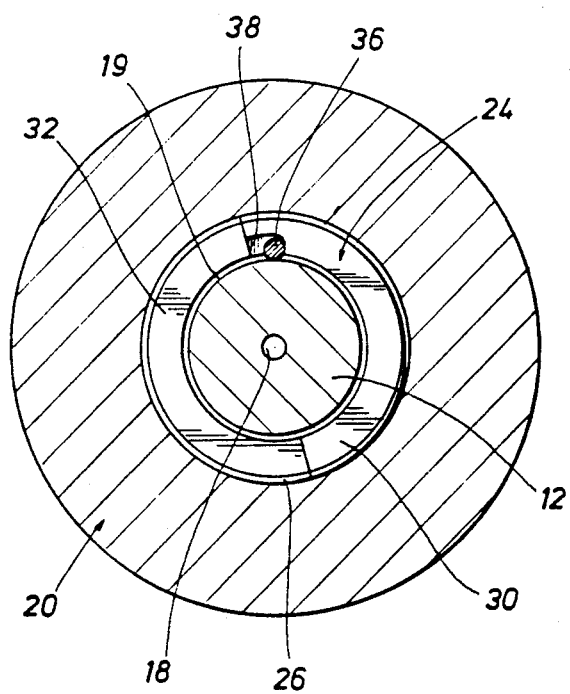
FIG. 2 is a section taken generally along line 2—2 of FIG. 1 and showing a retainer ring formed by the method of the present invention for retaining the roller cutter on the journal.
Figure 3:
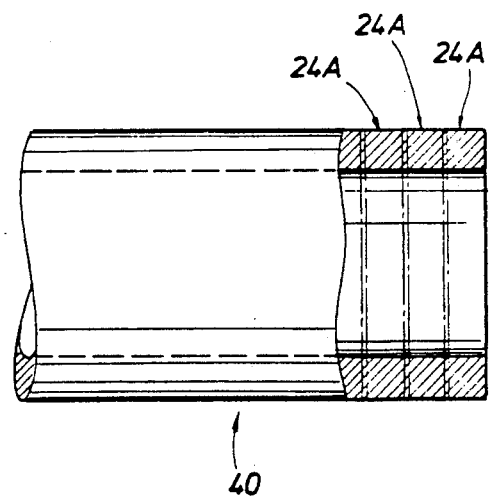
FIG. 3 is a schematic view illustrating an initial step in the method of threaded retainer ring by the cutting of a ring from an end of a tubular member.

Referring now more particularly to FIGS. 1 and 2, a leg or lug of a rotary drill bit is shown generally at 10 and has a journal shown at 12 at its extending end. Journal 12 includes a thrust bearing surface 14 and an annular bearing surface 16 with a lubricant passage 18 communicating with a lubricant source (not shown) to provide lubricant to the bearing surfaces including surfaces 14 and 16. An annular groove 19 extends about journal 12. A roller cutter is generally indicated at 20 and has cutting elements 22 projecting therefrom for engaging a formation in cutting relation. Roller cutter 20 has an internal cavity which receives journal 12 and has an internally threaded portion shown at 23.

For retaining roller cutter 20 on journal 12, a retaining ring shown generally at 24 is provided having an outer periphery formed with screw threads 26. Ring 24 is formed of two semicircular portions or sections 30 and 32 which are adapted to fit within groove 19 on journal 12. For positioning and retaining roller cutter 20 onto journal 12, semicircular portions 30 and 32 are first positioned within groove 19 about journal 12 and a tool 36 is fitted within a slot 38 for preventing rotation of ring 24 within groove 19. Then, roller cutter 20 is threaded onto ring sections 30 and 32 with screw threads 26 engaging screw threads 28 with a predetermined fit for retaining roller cutter 20 onto journal 12 while mounting roller cutter 20 for rotation thereon.

A desired fit between roller cutter 20 and ring 24 is obtained from screw threads 26 and 28 formed in accordance with thread class 2A of the American Standard for Unified Screw Threads for fine thread series UNF.

Retainer ring 24 forms a retaining thrust bearing and if the clearance between the screw threads 23 of roller cutter 20 and screw threads 26 on ring 24 exceeds a predetermined amount, sufficient looseness will be provided so that under prolonged periods of use under high rotational stresses such as encountered in very hard formations, mechanical wear and/or breakage problems such as possible stripping of the threads may occur. Thus, it is necessary to have a relatively tight fit with a precise clearance provided between the interfitting screw threads on roller cutter 20 and thrust ring 24.

The present invention is particularly directed to the method of forming retaining ring 24. As set forth above, it has been common heretofore to form screw threads on an outer periphery of a retaining ring after the ring was cut into two semicircular sections or halves so that undesirable looseness of the retaining ring resulting from the ring material being removed by the two cuts would not occur. If the cut has a width or thickness more than around 0.003 inch then it is possible that an undesirable looseness of ring might result providing an undesirable clearance between screw threads on the roller cutter and screw threads on the ring.

The present invention permits the screw threads to be formed on the retaining ring prior to the cutting of the ring into two semicircular sections or portions by making the ring oversized to compensate for the thickness of the ring material removed by the cutting operation, such as by sawing with a diamond saw or the like.

If the width or thickness of the material being removed by the cut is generally greater than around 0.015 inch and the outer threaded diameter of the ring is oversized prior to splitting to compensate for the cut, there may be difficulty in screwing the two semicircular portions of the ring into the cutter because they are out-of-round too much. Thus, in order to make the ring more round so that it can be easily assembled with the cutter, yielding of the semicircular portions of the ring is provided. If the width of the material being removed by the cut is around 0.015 inch or less, it is usually not necessary to yield the semicircular portions of the ring because they can be easily screwed into the cutter. For determining the amount of the oversizing of the outer threaded ring diameter of the ring which is designated as Y and compensates for the cuts, it is noted that the oversized outer circumference C1 of the ring before splitting is reduced by the thickness of the two cuts indicated by 2W. The desired circumference C of the ring after splitting and assembling with the roller cutter is equal to the oversized outer circumference C1 reduced by the thickness 2W of the two cuts. Thus, the desired diameter D to achieve the proper thread two cuts. Thus, the desired diameter D to achieve the proper thread fit for the assembled ring is increased by $$\frac{2W}{\pi}$$

to form the oversized diameter D1.

The following formulas are utilized:

$$C1 = C + 2W \quad (1)$$

where
(a) C1 = Outer threaded circumference of oversized ring before splitting.
(b) C = Desired outer threaded circumference of ring after splitting and assembled with roller cutter for proper fit.
(c) W = Thickness or width or cut and material removed by cut.

$$2. \ Y = \frac{2W}{\pi} = D1 - D$$

where
(a) Y = Amount to increase desired outer threaded diameter D.
(b) D1 = Oversized outer threaded diameter of threaded ring before being cut into two halves.
(c) D = Desired outer threaded diameter of two halves of ring assembled in roller cutter for desired thread fit.

Figure 4:
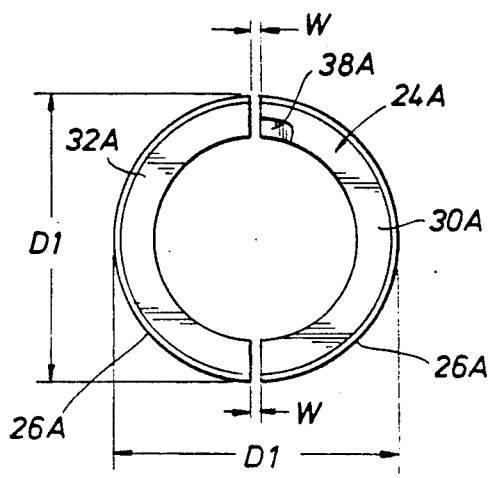
FIG. 4 is a plan of a threaded retainer ring after being cut into two semicircular portions or halves with the spacing between the semicircular portions illustrating the width of the cut.
Figure 5:
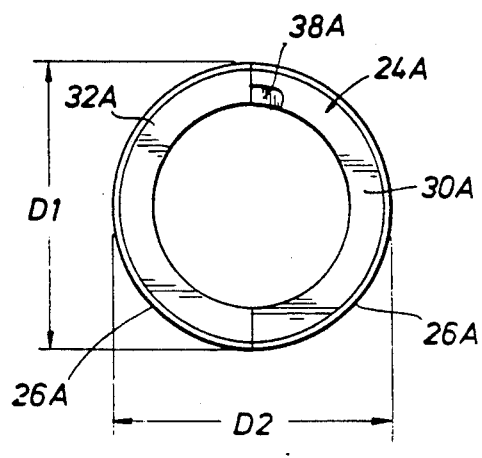
FIG. 5 is a plan similar to FIG. 4 but showing the two halves in a mating end-to-end relation.

Referring to FIGS. 3–6, the method for forming the threaded ring is shown schematically. First, a tubular stock material shown at 40 is cut into a plurality of unfinished rings 24A. Rings 24A are finish machined and formed with screw threads 26A and slots 38A. If desired, the tubular stock can be threaded prior to cutting into rings. Ring 24A as shown in FIG. 4 is then such as by a diamond saw taking a cut having a thickness designated by W in FIG. 4 of around 0.015 inch for example. As shown in FIG. 4, diameter D1 is not affected by the cut W and maintains its oversized dimension. However, as shown in FIG. 5 with halves 30A and 32A mated by placing in end-to-end contact, original oversized diameter D1 is reduced by the amount W in one direction at right angles to the direction of the cut as shown at D2. It is noted that transverse dimension D2 is not a true diametrical dimension and that the desired diameter D would be of a dimension grater than D2 but less than D1. The oversize outer diameter D1 before splitting the ring is equal to the desired outer diameter $$D + \frac{2W}{\pi}$$

where D is the diameter needed for the ring for a proper thread fit of the assembled ring in the cutter. For example, if the width W of 0.015 inch is to be made to achieve a desired ring diameter D of 2.000 inch the oversized outer diameter D1 of the ring before cutting would be $$2.000 + 2\left(\frac{.015}{\pi}\right) = 2.0095 \text{ inch.}$$

While an out of round configuration is shown in FIG. 5 the two halves 30A, 32A can easily be threaded onto roller cutter 20 with an acceptable fit if not more than a 0.015 inch thickness cut is made as only a relatively small out of roundness is provided. The ring halves 30A and 32A have some resilience and roller cutter 20 can easily conform ring halves 30A and 32A to a substantially round configuration when roller cutter 20 is threaded onto ring halves 30A and 32A. However, if the width of the cut is greater than around 0.015 inch then the ring halves 30A and 32A are yielded or shown in FIGS. 6 and 7.

Figure 6:
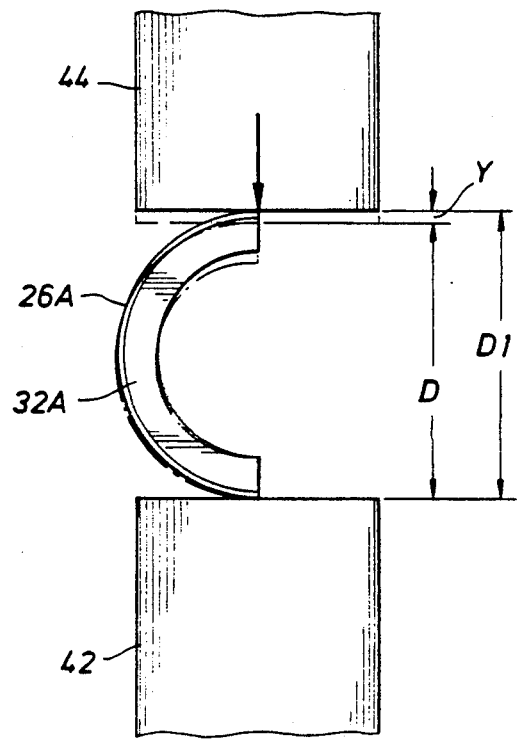
FIG. 6 is a schematic view illustrating the method of making the threaded retainer ring by applying a compressive loading to an oversized semicircular ring portion for yielding the semicircular ring portion a predetermined amount.

To return ring portions 30A and 32A to a more circular position, a squeezing or yielding of the material is provided as shown in FIG. 6 by a compressive force. Semicircular portion 32A is suitably clamped between a support 42 and a movable member 44 for exerting a downward compressive loading against ring 32A for yielding semicircular portion 32A an amount shown at Y which is the difference between diameter D1 and diameter D. It is noted that a certain amount of resilience or spring back is provided by the material which might vary depending on the type of material and the size of semicircular portion 32A. However, the amount of spring back can usually be determined by trial and error after yielding of an initial semicircular portion. Support 42 and movable member 44 may be provided with interfitting screw threads so that the external screw threads on semicircular portion 32A are not damaged upon yielding of the semicircular portion 32A. After yielding of the semicircular portions 30A and 32A to a more circular relation, portions 30A and 32A may be positioned within groove 19 and roller cutter 20 threaded thereon in assembled relation. If the thickness W of the cut is more than around 0.045 inch, the yielding of ring 24 or ring halves 30A, 32A to obtain a circular configuration would not appear to be feasible.

Figure 7:
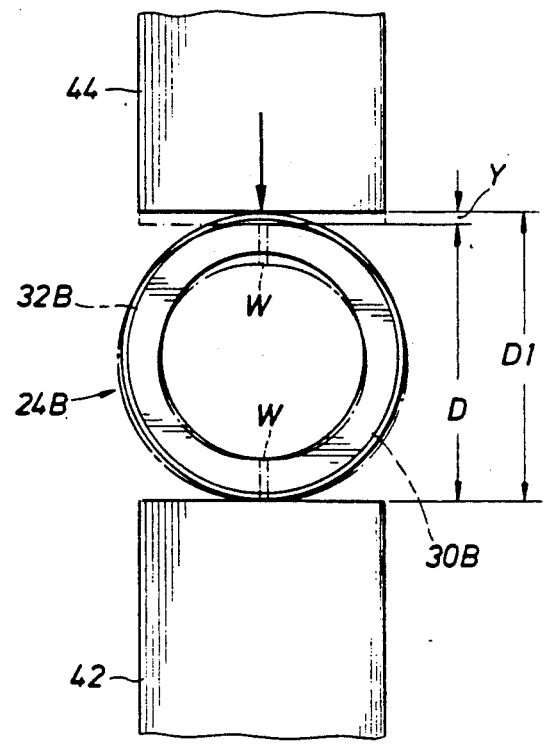
FIG. 7 is a schematic view illustrating an alternative method of the present invention in which a compressive loading is applied to an oversized threaded ring prior to the cutting or forming of the ring into two semicircular portions.

FIG. 7 illustrates an alternative method of forming a retainer ring in which ring 24B is first yielded before being cut into semicircular portions 30B and 32B. Thus, if the desired ring diameter is 2.000 inches as indicated at D in FIG. 6 and a cut of 0.30 inch is desired, then ring 24B is oversized an amount as shown as diameter D1 of $$2.000 + 2\left(\frac{.030}{\pi}\right) = 2.019 \text{ inch}$$

with the yielding of ring 24B to a non-circular or oval position being around 0.19 inch. After squeezing or forming of ring 24B, ring 24B is cut as shown by the broken lines at W in FIG. 7 to form generally semicircular portions 30 B and 32B. Portions 30B and 32B when fitted together about journal 12 will be in a more circular relation and can be easily assembled onto cutter 20.

While preferred embodiments of the present invention have been illustrated in detail, it is apparent that modifications or adaptations of the preferred embodiments will occur to those skilled in the art. However, is it to be expressly understood that such modifications and adaptations are within the spirit and scope of the present invention as set forth in the following claims.

What is claimed is:

1. A method of making a threaded retainer ring for fitting within an annular groove on a journal of a rotary drill bit and engaging screw threads on a roller cutter to retain the roller cutter for rotation on the journal; said method comprising the following steps:

providing an externally threaded circular retaining ring of an outer diameter larger than a predetermined desired outer threaded diameter for retaining the cutter on the journal thereby to form a ring having an oversized outer threaded diameter prior to cutting of the ring into two separate semicircular portions for fitting within a groove of the journal; and then cutting said ring into two semicircular portions for fitting within the journal groove with the cut removing a thickness of material between 0.003 inch and 0.045 inch, the oversizing of said outer diameter being an amount to compensate for the thickness of material removed by cutting of said ring thereby to provide the desired outer threaded diameter.

2. The method as set forth in claim 1 including the step of applying a compressive loading against said ring portions for yielding said ring portions in a permanent set generally similar to the amount of oversizing of the said outer diameter of said ring thereof to provide a more circular configuration for the ring portions when fitting within the annular groove of the journal for threaded engagement of the roller cutter.

3. The method as set forth in claim 2 wherein the step of applying a compressive loading against said ring portions is made against said ring prior to the cutting of said ring into two semicircular portions thereby to deform the ring portions prior to cutting.

4. The method as set forth in claim 1 wherein the step of applying a compressive loading against said ring portions is made after the ring has been cut into two semicircular portions.

5. The method as set forth in claim 1 including the step of oversizing the outer diameter of said ring an amount equal to $$\frac{2W}{\pi}$$

where W is the thickness of the material removed by the cut.

6. A method of making split threaded retainer rings for retaining roller cutters on journals of a drill bit comprising the following steps:
   providing a tubular stock material of an outer diameter greater than a predetermined desired outer diameter of the retainer rings;
   cutting a circular retaining ring from an end of the stock material to provide a ring having an oversized outer diameter;
   providing external threads about the outer periphery of the ring and maintaining said oversized outer diameter; and
   cutting said threaded ring into two semicircular portions for fitting within a groove in a journal with the cut removing a thickness of material between around 0.003 inch and 0.045 inch, the oversizing of the outer diameter of the ring compensating for the removal of the thickness of material for providing the desired predetermined outer diameter for the retaining ring.

7. The method as set forth in claim 6 including the step of providing external threads about the outer periphery of the ring prior to the cutting of the ring from the tubular stock material.

8. The method as set forth in claim 6 including the step of providing external threads about the outer periphery of the ring after the cutting of the ring from the tubular stock material.

9. A method as set forth in claim 6 including the step of applying a compressive loading against said ring portions for yielding said ring portions in a permanent set thereby to provide a true circular configuration for the ring portions when fitting within the annular groove of the journal for threaded engagement of a roller cutter.

10. The method as set forth in claim 9 wherein the step of applying a compressive loading against said ring portions is made against said ring prior to the cutting of said ring into two semicircular portions thereby to deform the ring portions prior to cutting.

11. The method as set forth in claim 9 wherein the step of applying a compressive loading against said ring portions is made after the ring has been cut into two semicircular portions.

12. A method of retaining a roller cutter on the journal of a rotary drill bit including the following steps:
   providing an annular groove about the journal of the drill bit;
   providing a ring of an oversized outer diameter greater than a desired predetermined final outer diameter of the ring;
   forming external screw threads on said ring about the oversized outer diametrical surface thereof and maintaining an oversized outer diameter;
   then cutting the threaded ring into two semicircular portions;
   positioning the semicircular portions of the ring within the groove;
   providing a roller cutter having a central cavity therein to receive the journal;
   providing internal screw threads about the cavity of said roller cutter; and
   threading the internal screw threads of said cutter onto the external screw threads of the semicircular portions of said ring thereof to mount said roller cutter onto said journal for rotation.

13. A method of retaining a roller cutter on the journal of a rotary drill bit as set forth in claim 12 including the step of:
   oversizing the outer diameter of the ring an amount equal to $$\frac{2W}{\pi}$$

where W is the thickness of the material removed by the cut.

14. A method of retaining a roller cutter as set forth in claim 12 including the step of:
   providing mating screw threads on said roller cutter and said ring formed in accordance with thread class 2A for fine thread series UNF of the American Standard for Unified Screw Threads.

* * * * *